United States Patent [19]

Chen

[11] Patent Number: 4,948,090
[45] Date of Patent: Aug. 14, 1990

[54] INDUCTION TYPE AUTOMATIC-CONTROLLED FLUID FAUCET

[76] Inventor: Chge-San Chen, No. 45, Sec. 4, Tzu Chiang Rd, Shan Chung City, Taipei Hsien, Taiwan

[21] Appl. No.: 413,226

[22] Filed: Sep. 27, 1989

[51] Int. Cl.5 .............................................. F16K 31/06
[52] U.S. Cl. .................................... 251/30.03; 251/65; 251/129.04; 4/623
[58] Field of Search .................. 251/129.04, 65, 30.03; 4/623

[56] References Cited

U.S. PATENT DOCUMENTS

| | | | |
|---|---|---|---|
| 3,333,160 | 7/1967 | Gorski | 251/129.04 X |
| 4,709,728 | 12/1987 | Ying-chung | 251/129.04 X |
| 4,826,129 | 5/1989 | Fong et al. | 251/129.04 |

*Primary Examiner*—Arnold Rosenthal
*Attorney, Agent, or Firm*—Leonard Bloom

[57] ABSTRACT

The present invention is to provide an induction type automatic-controlled fluid faucet, especially referring to a water faucet with completely brand new electromagnetic valve structure and automatic control circuit, which is characteristically comprising said electromagnetic valve device constituted by an iron-core consisted of a magnetic iron-core with a threaded non-magnetic iron core, and an engaged movable valve stem, which is equipped in the control valve and is wrapped on the exterior with several sets of polar plate, connected to a permanent magnet in series for each set of polar plate. The movable valve stem is attracted in the state of water-discharging due to the function of electromagnetic effects and is continuously attracted by the permanent magnet so as to avoid the usage of power and to prolong the service life of battery and to ensure the stable actuation of the movable valve stem while shielding (waving the hand) in front of the emission amplifier. And then the movable valve stem is going to be restored to the original "Shut the water flow" state while repeating the shielding action. A reset circuit is provided on the automatic control circuit device to ensure the movable valve stem to be able to secure in the "Shut the water flow" state at the beginning stage. A rapid-response circuit is preferably installed in the water-discharging controller so as to save the consumption of power during the water-discharging period. As a result, the present invention is indeed very economical and practical.

5 Claims, 6 Drawing Sheets

INDUCTION TYPE AUTOMATIC-CONTROLLED FLUID FAUCET

FIELD OF THE INVENTION

The present invention relates to an induction type automatic-controlled fluid faucet.

BACKGROUND OF THE INVENTION

The present invention is to provide a kind of induction type automatic-controlled fluid faucet, which is installed at the top with a magnetic-controlling type electromagnetic valve device which has a movable valve stem for securing the steady and correct actuation firmly so as to discharge a fluid on the spot and to eliminate losses in electrical power by matching with the automatic control circuit device. In the automatic control circuit, a reset circuit is installed for securing the valve stem on the "closed" position in order to avoid occurring the improper discharge of water at the beginning and assembling period.

The conventional automatic water faucet is designed to discharge or to stop water flow in the water faucet by means of an automatic control circuit together with an electromagnetic valve, which is consisted of a magnetic stem, compressed by a spring and wrapped with a coil. In case of appling electrical current, the stem is going to move to the spring after producing attractive force and them water is able to discharge. In case of stopping the power supply, water flow is stopped at the same time. Because the tensile strength of spring shall eliminate a part of attractive force on the stem during the water discharging stage of the above-mentioned water faucet, the actuation of the electromagnetic valve is not very steady when it is operated in high water pressure and especially for the case of using the battery as the power supply. Meanwhile, on account of the power for coil shall be continuously supplied during the operation period to secure the water flow, the conventional electromagnetic valve device is very power-consuming and is not an ideal one. Knowing the above-mentioned defects of the current automatic water faucet, the inventor have invented the present invention through the abundant experiences and knowledge in this kind of facilities.

OBJECT OF THE INVENTION

The object of the present invention is to provide a kind of induction type automatic-controlled fluid faucet equipped with a brand new electromagnetic valve.

Another object of the present invention is to provide a kind of induction type automatic-controlled fluid faucet which is able to discharge water immediately and is less in power consumption. The further object of the present invention is to provide a kind of induction type automatic-controlled fluid faucet equipped with a reset circuit which can eliminate the water consumption in double. Techniques, equipment, accessories and its effects for the above and other objects, features and advantages of the present invention will become more apparent from the following description when taken in conjunction with the accompanying drawings in which preferred embodiments of the present invention are shown by way of illustrative example. But, special terms of equipment and accessories are only for explanation are not limited.

DESCRIPTION OF THE PREFERRED EMBODIMENTS

Figure 1:
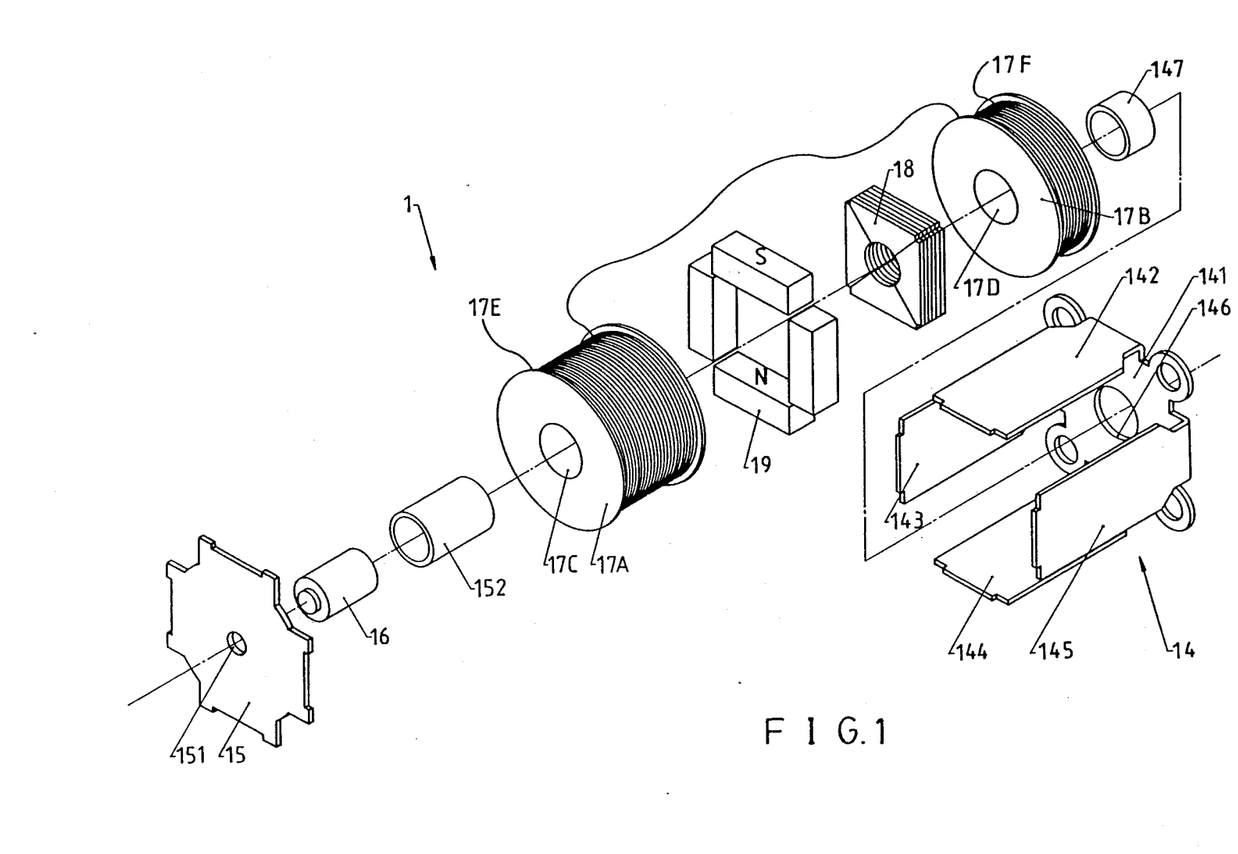
FIG. 1 is a perspective disassembled view of the present invention.
Figure 2:
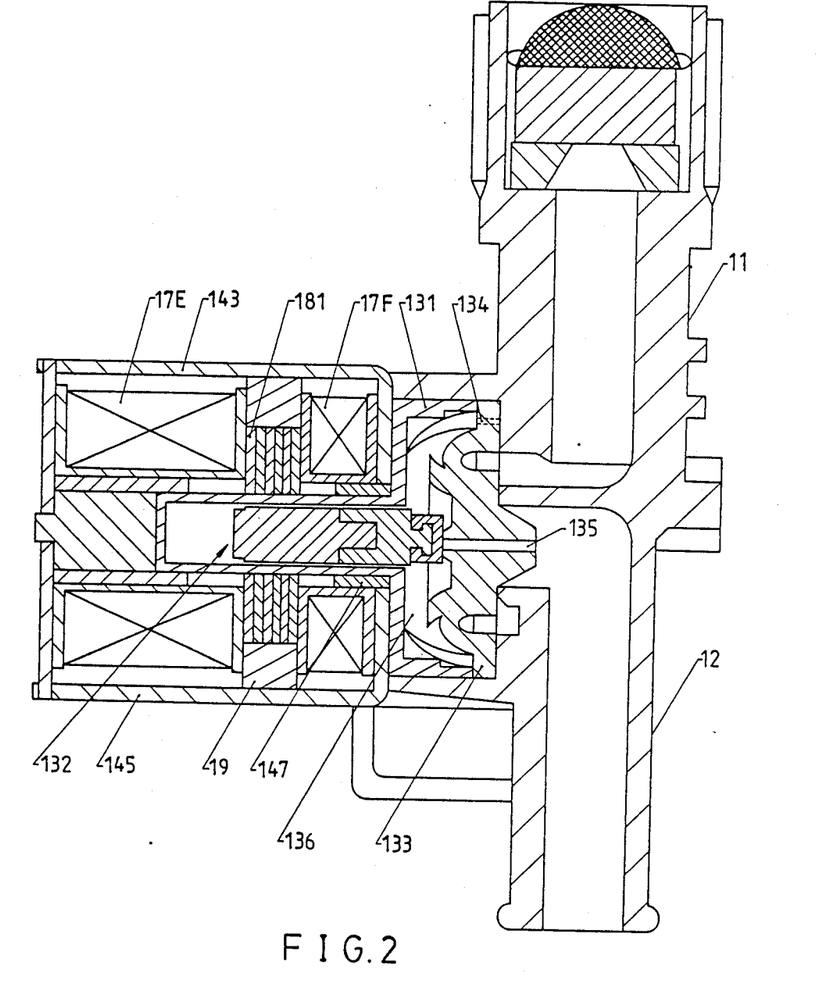
FIG. 2 is a crossectional view showing the closed state of the present invention.
Figure 3:
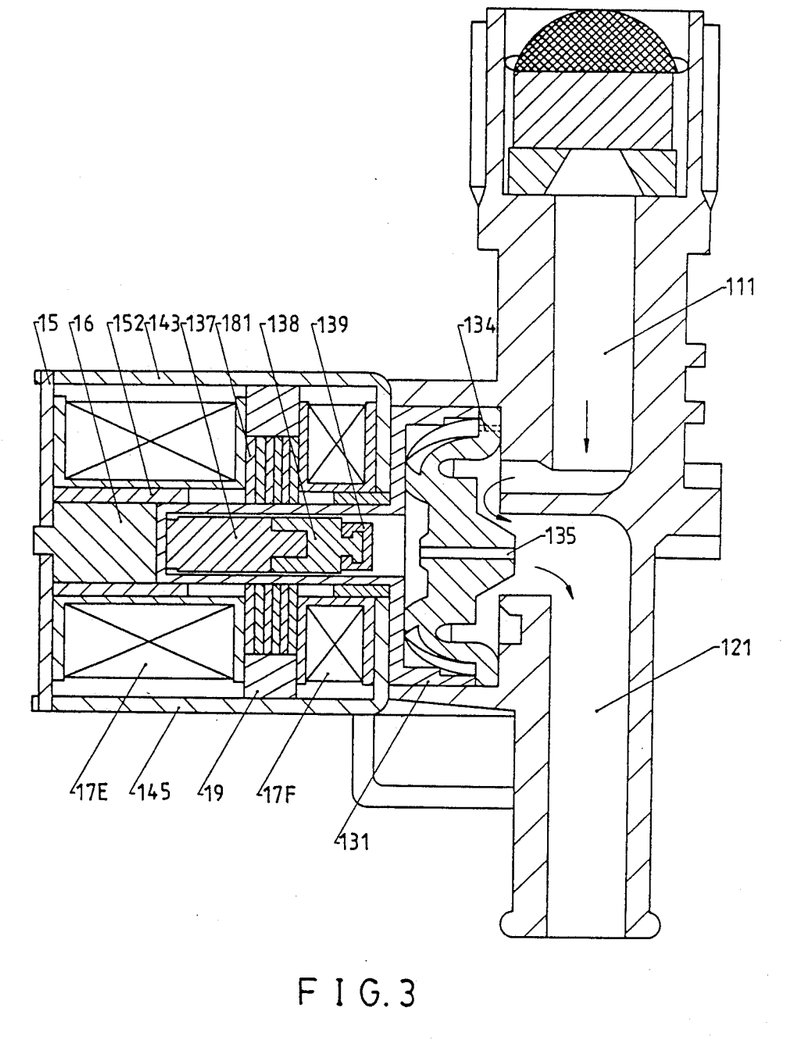
FIG. 3 is a crossectional view showing the opened state of the present invention.

The induction type automatic-controlled fluid faucet according to the present invention is consisted of an electromagnetic valve device 1, located in between the water-inlet pipe and the water-outlet pipe, and an automatic controlling circuit device 2, equipped in between the power supply and the electromagnetic valve device. Based on the matching actuation of above two devices, the water faucet can be driven to start or close the water supply. The characteristics in construction and the working theories of the whole device of the present invention is detailed as follows:

As shown in FIG. 1 to 3, the electromagnetic valve device 1 is consisted of a water-inlet pipe 11, a water-outlet pipe 12, a control valve 13, an U-shaped plate 14, a base plate 15, a fixed valve stem 16, two coiled wheels 17A, 17B, a polar plate 18 and a permanent magnet 19, in which, the pipe 11 is supplied with a water-inlet hole 111 for permitting the inlet flow of water, and the pipe 12 is also supplied with a water-outlet hole 121 for the outflow of water.

The control valve 13, equipped in between the pipe 11 and the pipe 12, is consisted of a fixed guiding-pipe 131, a movable valve stem 132 and a rubber valve 133, in which, both the pipe 131 and the valve 133 are the same as the conventional valve in structure e.g. a small water-inlet hole 134 and a small water-outlet hole 135 are provided above the valve 133, then the valve 133 and the stem 132 separate the pipe 131 and form a back-pressured chamber 136, and water can be flowed into the chamber 136 through the hole 134 in normal state because the chamber 136 is going to be filled with water due to the blockage of the hole 135 by the stem 132. In case of the stem 132 is going to be apart from the hole 136, the pressure in the hole 111 is going to be higher than that in the chamber 136 and then the valve 133 is going to be opened so as to push the water flowing out from the hole 121. The stem 132, located in the chamber 136, is consisted of a non-magnetic iron core 138 connected threaddedly to the magnetic iron core 137 and a rubber 139, which is engaged on the top of core 138, then, the stem 132 can be moved in the chamber 136 through the induction action of electrical magnetic field at the surrounding so as to control the operation of water flow.

The U-shaped plate 14, which is a magnetic body, is consisted of a receiving set 141, which is in one-piece formed shape, and four set of steel sheet 142, 143, 144, 145, which are respectively extended from the set 141, in which, the set 141 is supplied at the center with a round hole 146, which is firmly provided with a round cylinder 147 in order to afford the installation of the pipe 131.

The base plate 15, being in round shape, is pressedly installed with a steel sheet of U-shaped plate at the circumference respectively, in which, the plate 15 is provided with a hole 151 at the center and is firmly secured to a round cylinder 152 at the center of upper surface extended upwardly to the lower portion of the pipe 131.

The fixed valve stem 16, being a magnet in an one-piece structure, is installed in the round cylinder located on the top surface of the base plate, and the end with small diameter is passing through the hole 151 above the base plate and is pressedly secured firmly. The coiled wheels 17A, 17B, which are provided with two empty chambers 17C, 17D, are individually engaged on the cylinder 152 of the base plate and the cylinder 147 of the U-shaped plate. Two coils 17E, 17F, are respectively installed on the wheels and are connected together in series, in which, two ends of coils are respectively secured to the output end of the automatic control circuit.

The polar plate 18 is a rectangular body consisted of four sets of magnetic iron-core, which is consisted of six pieces of trapezoid column body 181 and is secured in between two coil wheels. The upper of the plate 18 is connected to the N pole of the permanent magnet 19, which S pole is connected to the U-shaped plate, in which, both the plate 18 and the permanent magnet 19 are located between two coiled wheels.

Figure 4:
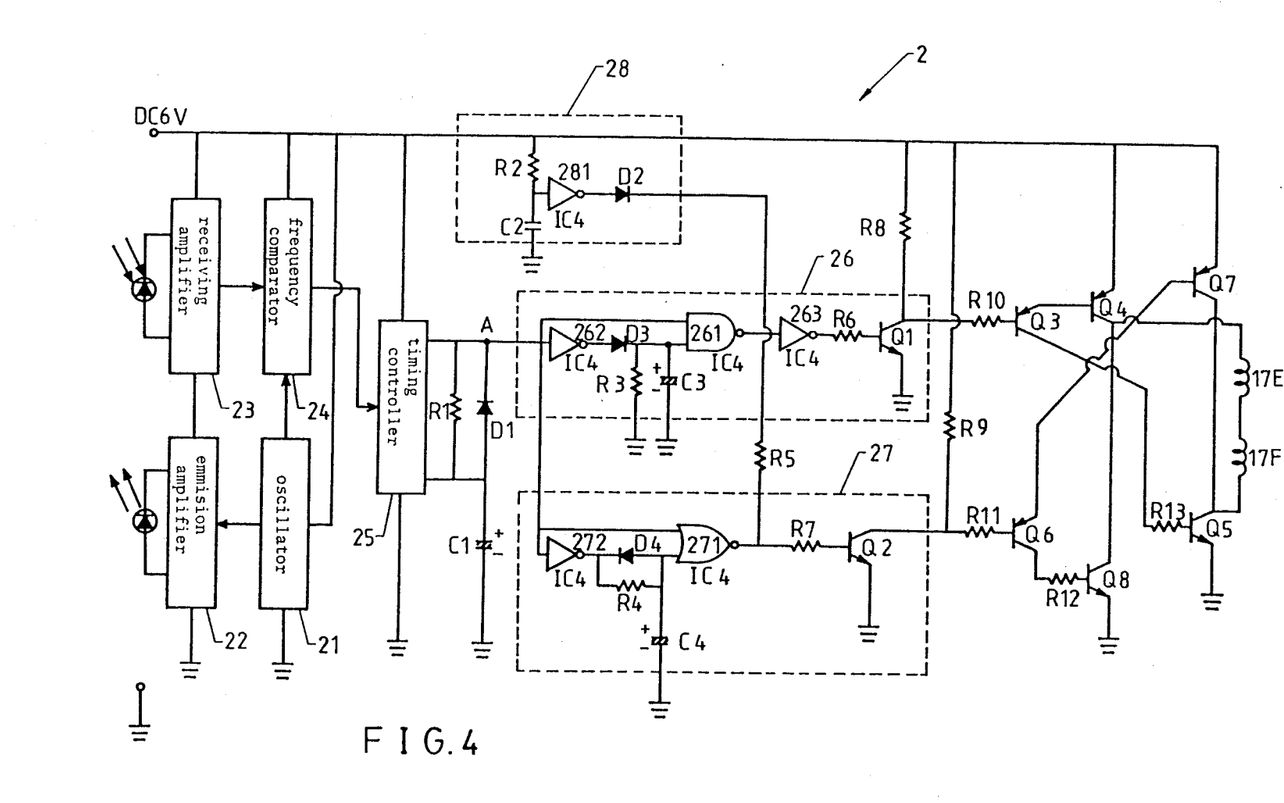
FIG. 4 is a circuit diagram of the automatic-controlled circuit device of the present invention.

All above description are concerning to the structure and the constitution of the electromagnetic valve device. The structure and working theories of the automatic control circuit are described as follows:

As shown in FIG. 4, the automatic control circuit device 2 is consisted of an oscillator 21, an emmision amplifier 22, a receiving amplifier 23, a frequency comparator 24, a timing controller 25, a water-discharging controller 26, a water-flow stopping controller 27 and a reset circuit 28, in which, the structure and function of the previous five constitutents are almost the same as those of conventional circuit and are going to repeat the description for them.

Figure 5:
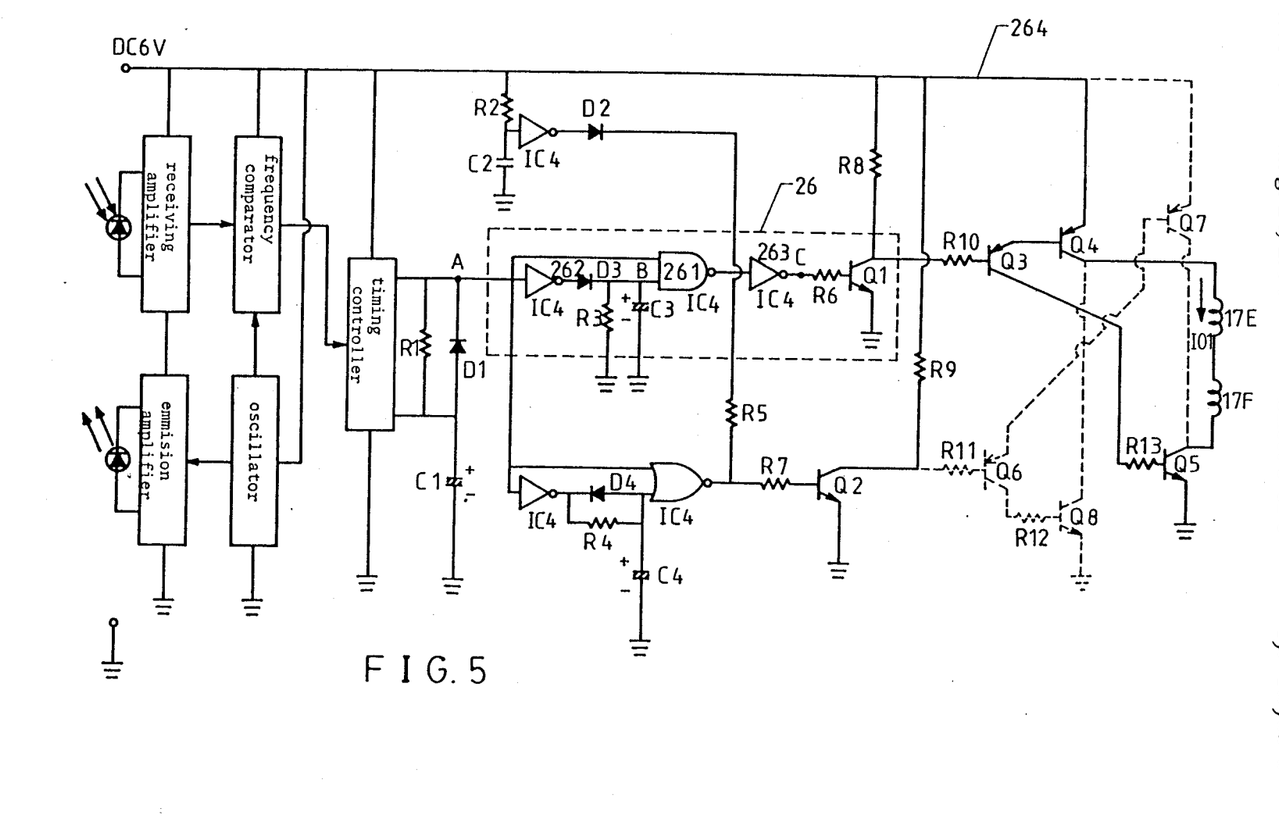
FIG. 5 is a diagram of output amplifier, shown by the black lines in the rear part of the drawing, of the present invention in the stage of water-discharging.
Figure 6:
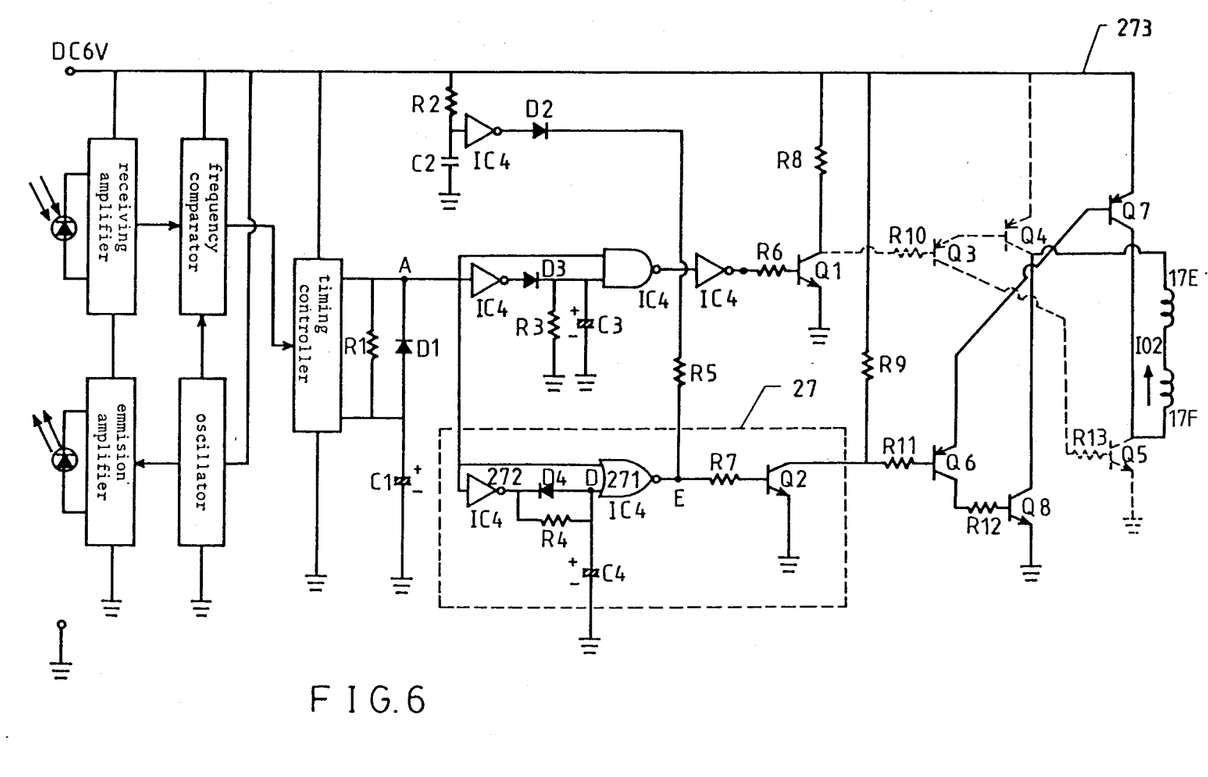
FIG. 6 is a diagram of output amplifier, shown by the black line in the rear part of the drawing, of the present invention in the stage of stopping the water supply.

The output ends of the timing controller are respectively connected in parallel to the controller 26 and the controller 27, in which, the controller is provided with a NAND gate 261 which has one end connected directly to the output end of the controller 25, and another end is consisted of a rapid-response circuit, constituted by a D3 connected to the inverter 262 in series and R3, C3 connected to said D3 in parallel, a NAND gate 263 and a transistor Q1. The controller 27 is provided was a NOR gate 271 which has one end connected directly to the output end of the timing controller, and another end is consisted of a rapid-response circuit, constituted by an inverter 272 connected to R4 and D4 in parallel and connected to C4 in series, and a transistor Q2. The rear end of the above-mentioned two controller are provided with output amplifiers 264, 273 (as shown in FIG. 5 and FIG. 6), which is consisted of a NPN transistor and two PNP transistors, connected to two ends of the coils 17E, 17F respectively so as to control the actuation of the movable valve stem.

The reset circuit 28, composed of R2 which is connected to the C2 and the inverter 281 and D2 which is connected to said inverter 281, is equipped in between the power supply and the output end of the controller 27. In the beginning of assembling and operating of the whole device, it can ensure the movable valve stem is in the "shut" position. Furthermore, the D2 can prevent the controller 27 from signal feedback and reach the purposes of double protections.

The following descriptions are for the actuation of whole device:

1. When the amplifier 23 is free from receiving signals (in the initial state), the output A point of timing controller is in the "0" state and the whole device remains in the original state, i.e. the stem 132 blocks the hole 135 of the valve 133 (as shown in FIG. 2) and then the faucet maintain in the "shut" state.

2. Refering to the FIG. 5, in case of the amplifier 23 receiving a signal, the output A point of timing controller is in the "1" state and the timing controller starts to be charged and to count the time through R1, C1. Said signal changes to the "0" state due to the inverter 262, and then D3 is cutted off, C3 starts to discharge, therefore, the potential of B point is in "1" state in the beginning, after both two signal passing through the NAND gate 261 and the inverter 263, the potential of C point is in "1" state and push the transistor Q1 to be actuated, meanwhile, two driving transistor Q3, Q4 are also actuated due to the emitter bias being higher than that of the base, and then bias at the R13 is generated and the output transistor Q5 to be also actuated, as a result, the output 101 passes the coil 17E, 17F in the direction as shown by arrows. As illustrated in FIG. 2, the threaded end of the movable valve stem at the "shut" position is becoming to the "S" pole due to the plate 18 being magnetized by the permanent magnet 19 and another end becomes "N" pole, meanwhile, due to the current 101 passing to the 17F through 17E, the movable valve stem is rapidly departed from the hole 135 and is driven to be attracted on the bottom of the plate 131 (as shown in FIG. 3) through generating a moving force foward to the stem 16 through the magnetic effects adding to the attractive force by the action of "S" pole of the stem 16 on "N" pole of the stem 132 so as to reach the purpose of discharging water. After the potential of B point is changed into "0" state (the setting times of R3, C3 are some 0.5 second), the potential of C point is also in the "0" state, the functions of transistors Q1, Q3, Q4 and Q5 are cutted off, therefore, the stem 132 is attracted in the fixed position and the water-discharging function is steadily maintained without the usage of power.

3. Refering to FIG. 6, after the amplifier 23 receiving second signal (such as waving the hand under the faucet) or the setting time being over, the output A point of the controller 25 is changed into the "0" state and the signal changes into the "1" state through passing the inverter 272 so as to charge the R4, C4 so as to ensure the voltage at D point to be in "0" state, after both signals passing through the NOR gate 271, the voltage at E becomes "1" state and then actuate not only transistor Q2 but also two driving transistors Q6, Q7 so as to produce bias on R12, then, the output transistor Q8 is also actuated, the current 102 passes through the coils 17E, 17F in the direction as shown by the arrows, as illustrated in FIG. 3, the threaded end of the movable stem at the "Shut" position is becoming to the "N" pole due to the plate 18 being magnetized by the permanent magnet 19, and another end becomes "S" pole, meanwhile, due the current 102 passing to the 17E through 17F, the movable valve stem is rapidly driven to block on the hole 135 (as shown in FIG. 2) through generating a moving force forward to the valve 133 through the magnetic effects adding to the expelling force by the action of "S" pole of the stem 16 on the "S" pole of the stem 132 so as to reach the purpose of stopping the water flow.

After the voltage at D is increased into "1" state (the setting times of R4, C4 are some 0.5 second), the potential of E point is immediately changed into "0" state, the functions of transistors Q2, Q6, Q7 and Q8 are cutted off, therefore the stem 132 is attracted in the fixed position and the function of stopping the water flow is steadily maintained without the usage of power.

Based on above descriptions, the induction type automatic-controlled fluid faucet according to the present invention is provided with a fully brand new electromagnetic valve device and can steadily maintain the movable valve stem on the shut (stop water-flow) or open (start water flow) only by utilizing the electromagnetic effect together with the attractive force produced by the permanent magnet.

Besides, the controller 26 and the controller 27 of the automatic control circuit device work steadily and the setting times on both the rapid circuits R3, C3 (for dischanging) and R4, C4 (for changing) provided in the device are very short, therefore, the transistors Q1, Q2 can be shut in a very short time after being actuated. As a result, the movable valve stem is attracted only by the function of the permanent magnet on either stages of "Shut" or "Open", it can eliminate the power consumption in the operation period and can prolong the service life of battery. In order to meet the purposes on lessening the power consumption and avoiding the movable valve stem being aparted from the hole 135 during the operation stage, a reset circuit is provided in the automatic control circuit device, after being installed and applied the power, the voltage of C2 is not fully charged and the signal is passing an inverter 281 and is changed into the "1" state, which will provide a signal to actuate the Q2 and to keep the movable valve stem on the "Shut" position that is similar to the action of clearing a signal so as to prevent the improper water discharging phenomena from occurring. The timing controller is designed for the user who does not wave the hand in front of the receiving amplifier. When the voltage at A point is "1" state, C1 is then charged, till reaching "1" state (setting time is about 60 seconds), which will actuate A point to change into "0" state so as to close the faucet and discharge the voltage through D1 and remain in the original state. Based on the abovementioned special design and construction, the automatic control circuit device matched with the electromagnetic valve device according to the present invention can ensure the function of water faucet for "water-discharge" and "stop water-flow" in a very short time and can eliminate the power consumption to avoid the defects of power-consumption during the water-discharge stage in the conventional automatic water faucet and meet the purposes on energy conservation.

Furthermore, the automatic control circuit device is characteristically provided with a reset circuit and a timing circuit, which can avoid water from wasting at the initial and the after-usage period and are very practicable. Besides, both the electromagnetic device and the automatic control circuit device according to the present invention are brand new in construction and technical field and are not found in the current products. It is no doubt to be new in its designing theories and pattern and meet the requirements to apply a patent.

Although this invention is fully capable of achieving the results and providing the advantages herein before mentioned, it is to be understand that it is merely the presently preferred embodiments thereof, and that I do not mean to be limited to the details of construction above described other than as defined in the appended claims.

What is claimed is:

1. In an induction type automatically controlled fluid faucet having a valve body including a fluid inlet port, a fluid outlet port, a valve chamber interposed between said inlet port and said outlet port, a valve in said valve chamber for controlling flow from said inlet port to said outlet port, said valve having a valve seat and a valve member extending across said valve seat and dividing said valve chamber into an inlet side and an outlet side, said valve member being movable into and out of engagement with said valve seat to prevent and to permit flow between said inlet port and said outlet port, said valve member having a control port therein communicating between said inlet side and said outlet side of said valve chamber, and a valve stem mounted in said inlet side of said valve chamber for reciprocation into and out of engagement with said control port of said valve member, said valve member being moved by fluid pressure within said inlet side of said valve chamber into engagement with said valve seat when said valve stem is moved into engagement with said control port;

improved means for controlling the reciprocal movement of said valve stem, wherein:

said valve stem comprises an elongated body having one end composed of magnetic material and the other end thereof composed of non-magnetic material, said valve stem body being mounted in said valve chamber with said non-magnetic end adjacent said control port of said valve member for axial reciprocation into and out of engagement with said control port;

a first permanent magnet assembly having a central bore therein, said first magnet assembly being mounted with said central bore thereof coaxially aligned with the path of reciprocation of said valve stem body and adjacent said magnetic end of valve stem body when said non-magnetic end of said valve stem body is in engagement with said control port;

a first electromagnetic solenoid mounted coaxially along the path of reciprocation of said valve stem body near the end of said path remote from said control port, said magnetic end of said valve stem body extending partially within said first solenoid when said valve stem body is at said end of said path;

a second permanent magnet extending axially into said first solenoid from the end thereof opposite the end of entry of said valve stem body into said first solenoid; and current control means connected to the winding of said first solenoid and adapted to apply a first momentary electric current to said winding of said first solenoid in a first direction to cause said first solenoid to generate a magnetic field attracting said valve stem body to enter said first solenoid and moving said non-magnetic end of said valve stem body out of engagement with said control port, said control current means being further adapted to apply a second momentary electric current to said winding of said first solenoid in a direction opposite to said first direction to cause said first solenoid to generate a magnetic field repelling said valve stem body away from said first solenoid and moving said non-magnetic end of said valve stem body into engagement with said control port, said valve stem body being held within said first solenoid by said second permanent magnet after the end of said first current, said non-magnetic end of said valve stem body being held in engagement with said control port by the action of said first permanent magnet on said magnetic end of said valve stem body after the end of said second current.

2. The improvement as claimed in claim 1, with additionally:

a second electromagnetic solenoid mounted coaxially along the path of reciprocation of said valve stem body near the end of said path adjacent said control port, the winding of said second solenoid being electrically connected in series with said first solenoid, said current control means being connected to said series connected windings of said first and second solenoids and being adapted to apply a momentary electric current to the windings of both said first and second solenoids in said first direction to cause said first solenoid to generate a magnetic field attracting said valve stem body to enter said first solenoid and to cause said second solenoid to generate a magnetic aiding said magnetic field of said first solenoid in attracting said valve stem body to enter said first solenoid.

3. The improvement as claimed in claim 2 wherein:

said current control means is further adapted to apply a momentary electric current in a direction opposite to said first direction to the windings of said series connected first and second solenoids, said opposite direction current causing said second solenoid to generate a magnetic field attracting said valve stem body away from said first solenoid and moving said non-magnetic end of said valve stem body into engagement with said control port and causing said second solenoid to generate a magnetic field aiding said magnetic field of said second solenoid in attracting said valve stem body away from said first solenoid, said non-magnetic end of said valve stem body being held in engagement with said control port by the action of said first permanent magnet on said magnetic end of said valve stem body after the end of said current of said opposite direction.

4. The improvement as claimed in claim 3 wherein said current control means includes:

a first output amplifier connected to one end of said series connected windings of said first and second solenoids for supplying current to said windings in said first direction;

a second output amplifier connected to the end of said series connected windings opposite said one end thereof for supplying current to said windings in said direction opposite to said one direction;

each of said first and second amplifiers being responsive to individual trigger signals applied thereto to conduct for the duration of said applied trigger signals, said first and second amplifiers being operatively interconnected so that when said first amplifier is conductive, said second amplifier is non-conductive and when said second amplifier is conductive, said first amplifier is non-conductive, and a reset circuit, operative upon the initial application of power to said current control means, for supplying a first trigger signal to said second amplifier to cause said second amplifier to conduct, said first trigger signal having a duration corresponding to the duration of said momentary current in said direction opposite to said first direction.

5. The improvement as claimed in claim 4 wherein said current control means further includes:

sensing means for generating a proximity signal in response to the proximity of a user's hand to said faucet;

logic means for alternately generating a second trigger signal and a third trigger signal upon successive appearances of said proximity signals from said sensing means, said logic means being responsive to the first appearance of said proximity signal after the initial application of power to said current control means to generate said second trigger signal, said second trigger signal being applied to said first amplifier to cause said first amplifier to conduct and supply current to said series connected windings of said first and second solenoids in said first direction, said logic means being responsive to the second appearance of said proximity signal to generate said third trigger signal, said third trigger signal being applied to said second amplifier to cause said second amplifier to conduct and supply current to said series connected windings in said direction opposite to said first direction; and a timing controller for limiting the duration of each said second and third trigger signals to a duration corresponding to the duration of said momentary current in said first direction and to the duration of said momentary current in said direction opposite to said first direction.

* * * * *